(12) United States Patent
Stober et al.

(10) Patent No.: US 11,989,236 B2
(45) Date of Patent: *May 21, 2024

(54) MODE-SPECIFIC SEARCH QUERY PROCESSING

(71) Applicant: INTERNATIONAL BUSINESS MACHINES CORPORATION, Armonk, NY (US)

(72) Inventors: Thomas Stober, Herrenberg (DE); Timo Kussmaul, Boeblingen (DE); Carsten Leue, Böblingen (DE); Uwe Karl Hansmann, Tuebingen (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/160,629

(22) Filed: Jan. 27, 2023

(65) Prior Publication Data

US 2023/0169119 A1 Jun. 1, 2023

Related U.S. Application Data

(63) Continuation of application No. 17/126,863, filed on Dec. 18, 2020, now Pat. No. 11,586,676.

(51) Int. Cl.
*G06F 16/90* (2019.01)
*G06F 16/901* (2019.01)
(Continued)

(52) U.S. Cl.
CPC ...... *G06F 16/90324* (2019.01); *G06F 16/901* (2019.01); *G06F 16/9035* (2019.01); *G06F 16/904* (2019.01); *G06F 16/906* (2019.01)

(58) Field of Classification Search
CPC ............ G06F 16/90324; G06F 16/901; G06F 16/9035; G06F 16/904; G06F 16/906
See application file for complete search history.

(56) References Cited

U.S. PATENT DOCUMENTS 8,239,377 B2    8/2012  Milic-Frayling et al.
9,418,243 B2    8/2016  Bauer et al.
(Continued)

OTHER PUBLICATIONS

Apache Software, "Context (Solr 4.5.1 API)", [online], [Retrieved on Dec. 9, 2020], Retrieved from the Internet at <URL: https://lucene.apache.org/solr/4_5_1/Solr-dataimporthandler/org/apache/solr/handler/dataimport/Context.html>, 9 pp.

(Continued)

*Primary Examiner* — Kristopher Andersen
(74) *Attorney, Agent, or Firm* — KONRAD, RAYNES, DAVDA & VICTOR LLP; Janaki K. Davda

(57) ABSTRACT

Provided are techniques for mode-specific search query processing. A current search query is received from a user, where the user has a user profile, and where the user profile has a public portion and a private portion. A query mode and a query context for the current search query are determined. In response to determining that the query mode is a guided mode, the current search query is rewritten based on the query context, the private portion of the user profile of the user, and the public portion of each corresponding user profile of each of one or more search influencers to generate a first rewritten search query; the first rewritten search query is executed to generate first search results; and the first search results are returned. In response to determining that the query mode is one of a public mode and a private mode, the current search query is rewritten based on the query context and the private portion of the user profile of the user to generate a second rewritten search query; the second (Continued)

rewritten search query is executed to generate second search results; and the second search results are returned.

20 Claims, 12 Drawing Sheets

(51) Int. Cl.
  *G06F 16/9032* (2019.01)
  *G06F 16/9035* (2019.01)
  *G06F 16/904* (2019.01)
  *G06F 16/906* (2019.01)

(56) References Cited

U.S. PATENT DOCUMENTS

| | | | |
|---|---|---|---|
| 9,489,458 | B1 | 11/2016 | Haugen et al. |
| 9,971,839 | B1 | 5/2018 | Spertus et al. |
| 10,120,998 | B2 | 11/2018 | Ghosh et al. |
| 2012/0246165 | A1 | 9/2012 | Batraski et al. |
| 2017/0090858 | A1* | 3/2017 | Paris ............... G06F 16/638 |
| 2017/0339248 | A1 | 11/2017 | Karalis et al. |
| 2019/0138940 | A1 | 5/2019 | Feuz et al. |

OTHER PUBLICATIONS

Baeldung, "Full-Text Search with Solr", [online] Last Modified Jul. 22, 2019, [Retrieved on Dec. 9, 2020], Retrieved from the Internet at <URL: https://www.baeldung.com/full-text-search-with-solr>, 9 pp.

Lucidworks, Inc., "Query Rewriting", [online], © 2020, [Retrieved on Dec. 9, 2020], Retrieved from the Internet at <URL: https://doc.lucidworks.com/fusion-ai/5.3/concepts/query-rewriting/index.html>, 8 pp.

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Recommendations of the National Institute of Standards and Technology, 7 pp.

Zhu, Z., "Improving Search Engines Via Classification", Dissertation Submitted to Birkbeck College, University of London, May 2011, 154 pp.

U.S. Appl. No. 17/126,863, filed Dec. 18, 2020, 57 pp.

Office Action dated May 11, 2022, 19pp., for U.S. Appl. No. 17/126,863.

Response dated Jul. 13, 2022, 16pp., to Office Action dated May 11, 2022, 19pp., for U.S. Appl. No. 17/126,863.

Notice of Allowance dated Nov. 3, 2022, 5pp., for U.S. Appl. No. 17/126,863.

IBM: List of IBM Patents or Patent Applications Treated as Related, Jan. 27, 2023, 2pp.

* cited by examiner

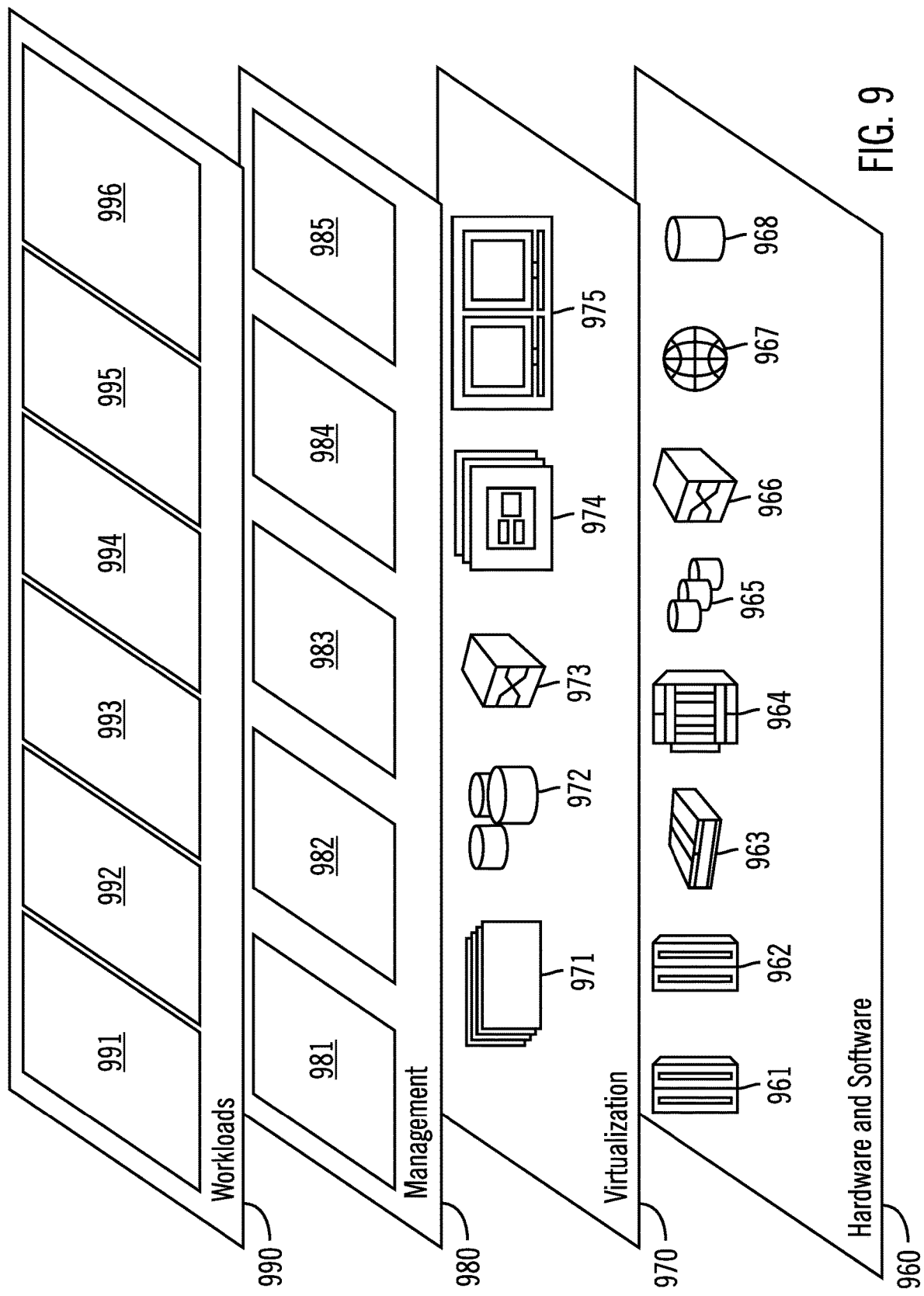

MODE-SPECIFIC SEARCH QUERY PROCESSING

BACKGROUND

Embodiments of the invention relate to mode-specific search query processing. These embodiments allow for a public mode, a private mode, and a guided mode for search query processing.

A search engine receives a search query with terms to be searched. The search engine may use one or more indexes to identify documents that have the terms in the search query. Then, the search engine may rank the documents and return a list of the ranked documents in response to the search request.

The search engine may take a users' search histories into account to provide search results to the users. The search engine may also take into account feedback and click-behavior of the users to provide the search results.

For example, if there is a singer named "ABC" and another entity named "ABC", when a user searches frequently for the singer and issues a new search query that includes "ABC", the search engine provides results that relate to the singer, rather than to the entity. For these cases, each user creates a context by issuing queries.

SUMMARY

In accordance with certain embodiments, a computer-implemented method comprising operations is provided for mode-specific search query processing. A current search query is received from a user, where the user has a user profile, and where the user profile has a public portion and a private portion. A query mode and a query context for the current search query are determined. In response to determining that the query mode is a guided mode, the current search query is rewritten based on the query context, the private portion of the user profile of the user, and the public portion of each corresponding user profile of each of one or more search influencers to generate a first rewritten search query; the first rewritten search query is executed to generate first search results; and the first search results are returned. In response to determining that the query mode is one of a public mode and a private mode, the current search query is rewritten based on the query context and the private portion of the user profile of the user to generate a second rewritten search query; the second rewritten search query is executed to generate second search results; and the second search results are returned.

In accordance with other embodiments, a computer program product is provided for mode-specific search query processing. The computer program product comprises a computer readable storage medium having program code embodied therewith, the program code executable by at least one processor to perform operations. A current search query is received from a user, where the user has a user profile, and where the user profile has a public portion and a private portion. A query mode and a query context for the current search query are determined. In response to determining that the query mode is a guided mode, the current search query is rewritten based on the query context, the private portion of the user profile of the user, and the public portion of each corresponding user profile of each of one or more search influencers to generate a first rewritten search query; the first rewritten search query is executed to generate first search results; and the first search results are returned. In response to determining that the query mode is one of a public mode and a private mode, the current search query is rewritten based on the query context and the private portion of the user profile of the user to generate a second rewritten search query; the second rewritten search query is executed to generate second search results; and the second search results are returned.

In accordance with yet other embodiments, a computer system is provided for mode-specific search query processing. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A current search query is received from a user, where the user has a user profile, and where the user profile has a public portion and a private portion. A query mode and a query context for the current search query are determined. In response to determining that the query mode is a guided mode, the current search query is rewritten based on the query context, the private portion of the user profile of the user, and the public portion of each corresponding user profile of each of one or more search influencers to generate a first rewritten search query; the first rewritten search query is executed to generate first search results; and the first search results are returned. In response to determining that the query mode is one of a public mode and a private mode, the current search query is rewritten based on the query context and the private portion of the user profile of the user to generate a second rewritten search query; the second rewritten search query is executed to generate second search results; and the second search results are returned.

BRIEF DESCRIPTION OF THE SEVERAL VIEWS OF THE DRAWINGS

Referring now to the drawings in which like reference numbers represent corresponding parts throughout:

FIG. 9 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments enhance a search service by providing a new user-selected three-state search query mode (i.e., public mode, private mode, and guided mode). The search service is extended to process the search query (i.e., perform query enhancement/query rewriting) based on the query mode. Embodiments allow the user to control data privacy by allowing a user to control how the search query is to be processed. In various embodiments, the user may be any entity (e.g., a person, a group, a computer, a robot, etc.).

In the public mode and the private mode, the search service does not use information gathered or determined by analysis of the search behavior of other users for processing the search query. In particular, in the public mode, the search service gathers information during processing of the search query for enhancing search queries of other users. In the private mode, the search service does not use information gathered during processing of this search query for enhancing the search queries of other users. Thus, search queries executed in private mode are identified as ones that should not be used for enhancing queries of other users.

In the guided mode, the search service uses information gathered by analysis of search queries of other users for automatically enhancing the search query. Optionally, in the guided mode, the user may select the group or the set of users whose search queries are analyzed and used for enhancing the search query. In certain embodiments, a user may want to specifically select a user or a group of (e.g., expert) users whose search behavior should be used for enhancing the user's search queries. The selected user or group of users may be considered "search influencers". In certain other embodiments, the search service may automatically determine the set of search influencers for search queries in guided mode.

Figure 1:
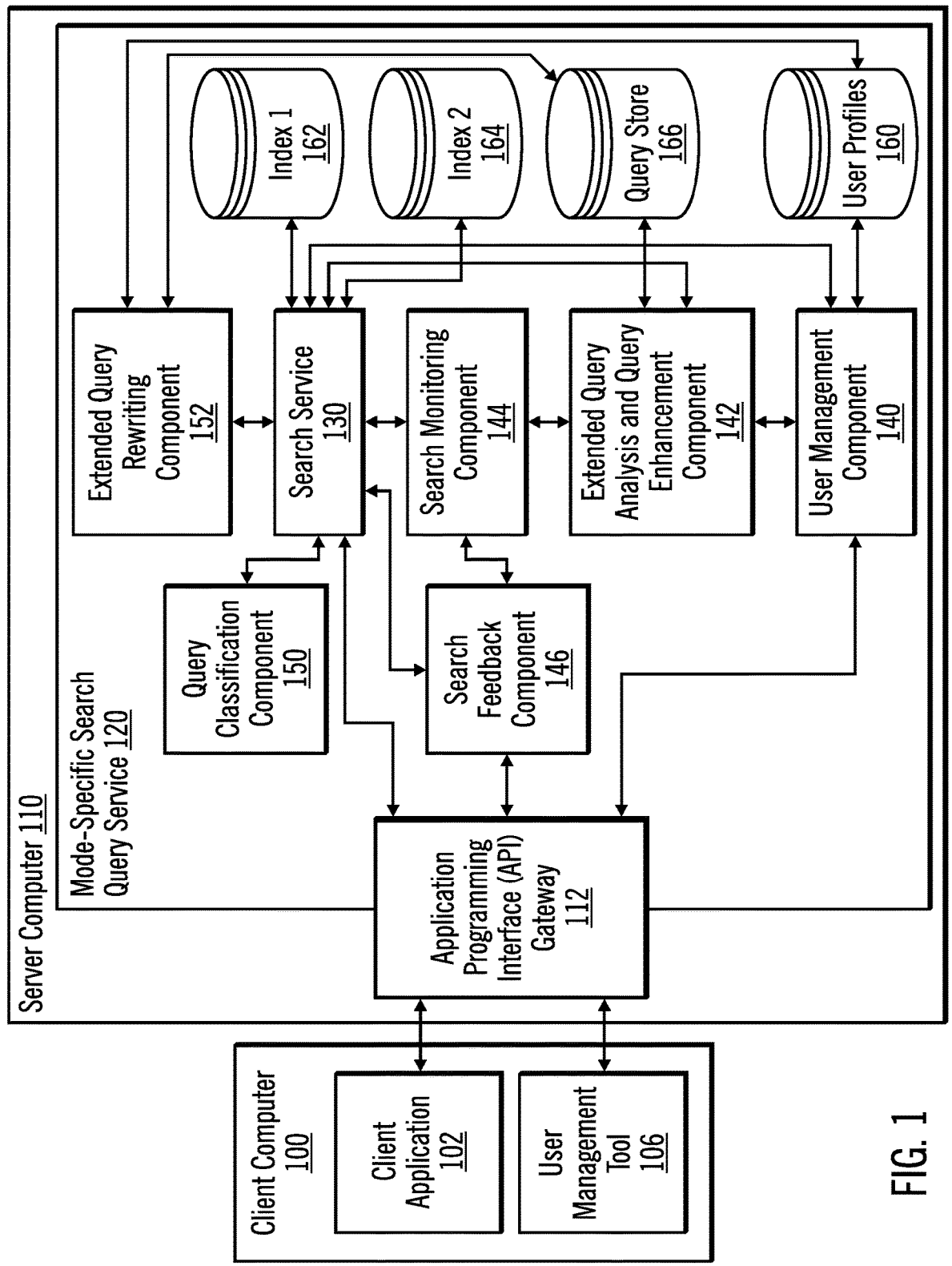
FIG. 1 illustrates, in a block diagram, a computing environment in accordance with certain embodiments.

FIG. 1 illustrates, in a block diagram, a computing environment in accordance with certain embodiments. In FIG. 1, a client computer 100 and a client computer 104 are connected to a server computer 110. Computers 100, 104, 110 may be connected directly or via a network. The client computer 100 includes a client application 102 and a user management tool 106. In certain embodiments, the client application 102 and the user management tool 106 may reside on different computers.

The server computer 110 includes a mode-specific search query service 120 that provides an Application Programming Interface (API) gateway 112. The API gateway 112 may provide several APIs (e.g., a search query API for submitting a search query, an update API for updating configuration parameters, etc.) to allow the client application 102 to interact with a search service 130 and to allow the user management tool 106 to interact with a user management component 140.

The mode-specific search query service 120 includes the search service 130, the user management component 140, an extended query analysis and query enhancement component 142, a search monitoring component 144, a search feedback component 146, a query classification component 150, and an extended query rewriting component 152. Also, the mode-specific search query service 120 includes user profiles 160 (in a data store) and one or more indexes, such as index 1 162 (in a data store), index 2 164 (in a data store), and a query store 166 (which is a data store for storing queries). The search service 130 may also be referred to as a search engine.

In certain embodiments, the search feedback component 146 is monitoring the reaction of the user with regard to the search results returned, while the search monitoring component 144 is managing the aspects of how to enhance the search query and post-process the search results to improve the search results sent back to the user. In certain embodiments, the search feedback component 146 generates feedback parameters that indicate whether the user clicks on a result of the search results, whether the user started a new search, etc.

The client application 102 may be described as a client of the search service 130. The client application 102 sends search queries (e.g., on behalf of a user) to the search service 130 via the API gateway 112. The client application 102 may be a smartphone application, a desktop application, a script executed in a web browser, etc. The search service 130 processes the search query and returns a search result via the API gateway 112 to the client application 102. Search queries may also be referred to as search requests.

The search service 130 provides functionality for searching for content items in structured data (e.g., a database) and unstructured data (e.g., text documents). In certain embodiments, the search service 130 creates the indexes 162, 164 by indexing content items (e.g., the text documents). Each search index 162, 164 contains a representation of the content for efficient processing of a search query by the search service 130. Each search index 162, 164 may be associated with a different search and ranking configuration, consisting of multiple configuration settings for search functionality, search behavior, and the structure of the content items in that search index 162, 164. The configuration parameters may be updated through an API provided by the search service 130, by uploading a set of configuration files to the search service 130 directly or by uploading a set of configuration files to a file system or a persistent storage that the search service 130 is using.

In certain embodiments, the search service 130, using the extended query analysis and query enhancement component 142, records search queries and query context (e.g., headers and parameters from the search query request or parameters that may be related to the search query, such as the location of the user, a user name, user attributes, an application state of the client application, etc.) in a query store 166 (e.g., a database or a file) and/or as analysis results in the user profile. Thus, the search service 130 is able to determine how often a search query was executed in a given timeframe or from a certain context. The search service 130 is also able to determine the most frequently issued search queries.

The search service 130, using the search feedback component 146 and search monitoring component 144, may also monitor how a user interacts with the search results of the search query. The search service 130 may use client-side analytics to monitor these interactions. For example, the user's browser on the client computer 100 may collect and share data on how the user interacts with the search results and send these to the feedback monitoring component 146.

The search service 130 may receive, from the search feedback component 146 and search monitoring component 144, a set of parameters from the monitored interactions and store, with the user management component 140, these parameters in the user profiles 160, together with an association with the related search query.

Figure 2:
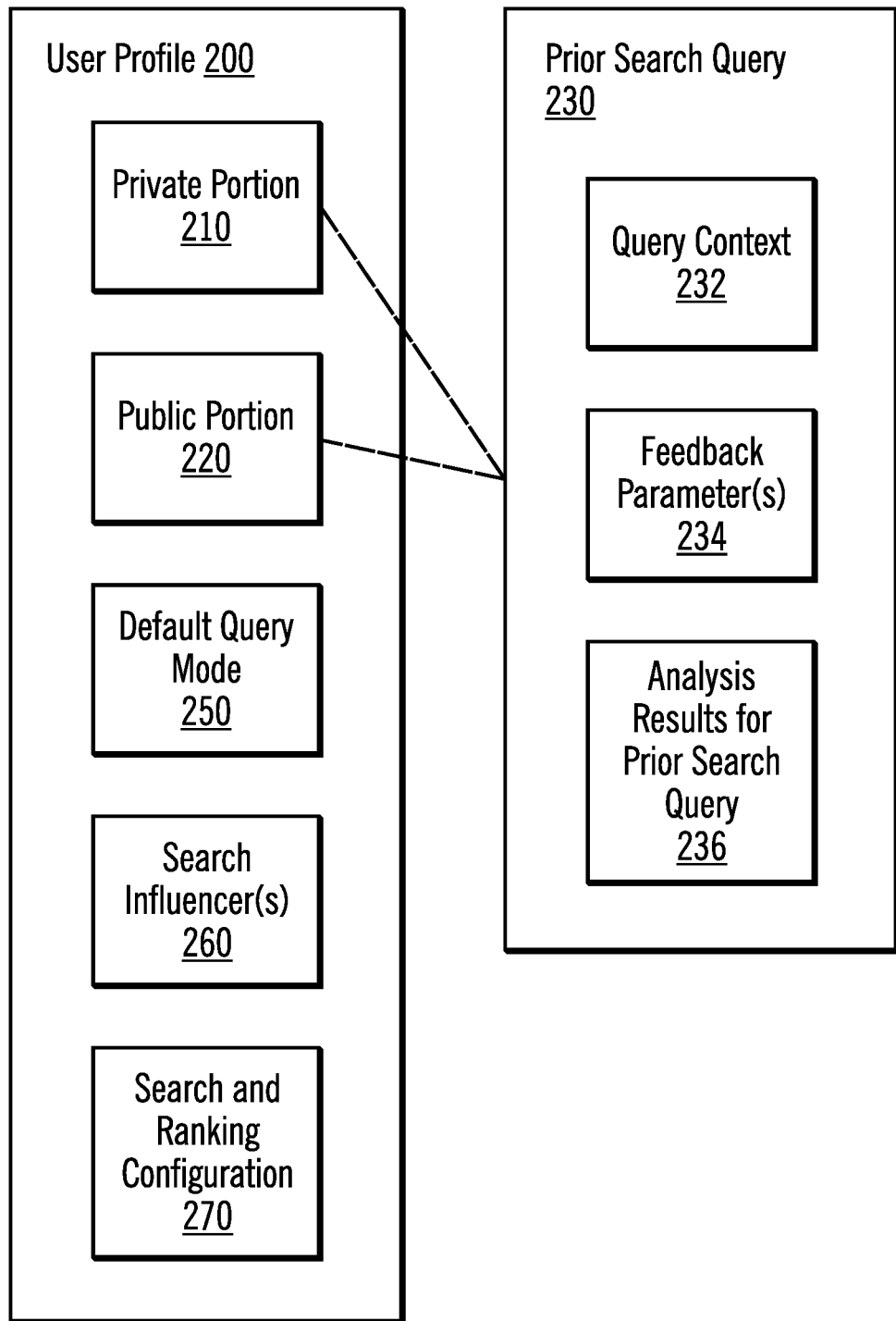
FIG. 2 illustrates, an example user profile in accordance with certain embodiments.

FIG. 2 illustrates, an example user profile 200 in accordance with certain embodiments. The user profile 200 may be stored with user profiles 160. The user profile 200 includes a private portion 210 and a public portion 220. The user profile 200 may include one or more of: a default query mode 250, one or more search influencers 260 (for guided mode), and a search and ranking configuration 270.

Either or both portions 210, 220 may store query data for the user, either gathered by the search service 130 by monitoring the user's behavior and query history or entered by the user via a user interface. The query data may include prior search queries issued by the user and information about each of the prior search queries. For example, for prior search query 230, the information includes query context 232, one or more feedback parameters 234, and analysis results for the prior search query 236 (i.e., the results of analyzing the prior search query).

The default query mode 250 is one of guided mode, public mode, and private mode. In certain embodiments, a user, via the client application 102, may specify one of the three query modes using a query parameter of a search query. Alternatively, the search service 130 enables the user to specify the default query mode 250 to be stored in the user profile 200. In certain embodiments, the user uses the user management tool 106 to provide the default query mode 250 via an API to the user management component 140 for storage in the user profile.

When a search query is received, the search service 130 determines the query mode from the query parameters, or, if not present there, uses the default query mode in the user profile 200 of the user who issued the search query via the client application 102. In certain embodiments, the search query includes a parameter that identifies the user who issued the search query.

The one or more search influencers 260 are other users whose search queries may be used to enhance the current search query. That is, in guided mode, for a current search query, the search service 130 determines the one or more search influencers 260 (i.e., users distinct from the user issuing the search query) and uses information gathered by analysis of prior search queries of these search influencers for automatically enhancing the current search query.

In certain embodiments, the user management component 140 provides an API or an interactive tool (as a User Interface (UI) component) that allows a user to select one or more search influencers 260 (e.g., expert users). For example, the user may use the user management tool 106 to select the one or more search influencers 260 and send the selection via the API to the user management component 140 for storage in the user profile. Each of the search influencers 260 may be identified by a user identifier (e.g., one that may be used to login to the search service 130). The user management component 140 creates or updates the user profile 200 to store the search influencers 260 (e.g., by storing the user identifier of each of the selected search influencers).

In certain alternative embodiments, the search service 130 automatically selects one or more search influencers. For example, the search service 130 may associate search influencers for different sets of keywords (where a particular search influencer may be associated with multiple sets of keywords). Then, for a search query, the search service 130 identifies keywords in the search query, compares those keywords to the sets of keywords, and uses the matching sets to identify one or more search influencers. The set of keywords and search influencers may be stored as keyword-search influencer tuples in the user profile 200.

In addition, the search service 130 may automatically select the one or more search influencers for one search query of a user, for all search queries of the user, for all search queries of a user's search session, etc.

Moreover, the search service 130 may analyze queries to automatically determine search and ranking configuration parameters and stores these parameters in the user's search profile.

In certain embodiments, the search service 130 uses feedback metrics, along with monitoring mechanisms and client-side analytics, for monitoring how a user interacts with a search result (and sending the result of this monitoring as feedback to the search service 130). For example, if a user regularly selects companyX related documents from the set of search results, the search service 130 notes this feedback and uses heuristics to create a boost query (i.e., an additional search query portion that is added to the received search query) for boosting the companyX related documents. The search service 130 stores this boost query in the user profile and applies this boost query automatically for processing future search queries. In this manner, future search results are automatically adapted to the user's behavior.

The search and ranking configuration 270 may include one or more of: boost queries, rules for modifying the search query, rules for modifying the search results, ranking parameters and ranking models used for ranking the search results, models or rules used for determining the semantic intent that is later used for adapting search queries and search results, etc.

In certain embodiments, the search and ranking configuration 270 includes one or more of the following:
  parameters for creating boost queries or boost factors that are automatically appended to the user's search query;
  parameters for creating filter queries that are automatically appended to the user's search query;
  parameters for creating subqueries that are automatically appended to the user's search query;
  parameters and machine language-trained models for re-ranking the search results;
  machine learning models or rules for determining the intent of the search query (which is later used for adapting the search query and/or the search results);
  parameters and rules for selecting a set of analyzers (e.g., components that are useful for query and document processing) that are used for processing the query;
  performance parameters for the selection of computing nodes (e.g., in a cloud infrastructure) that are selected for processing the search query; and
  a set of rules for modifying and rewriting the search query.

Figure 3:
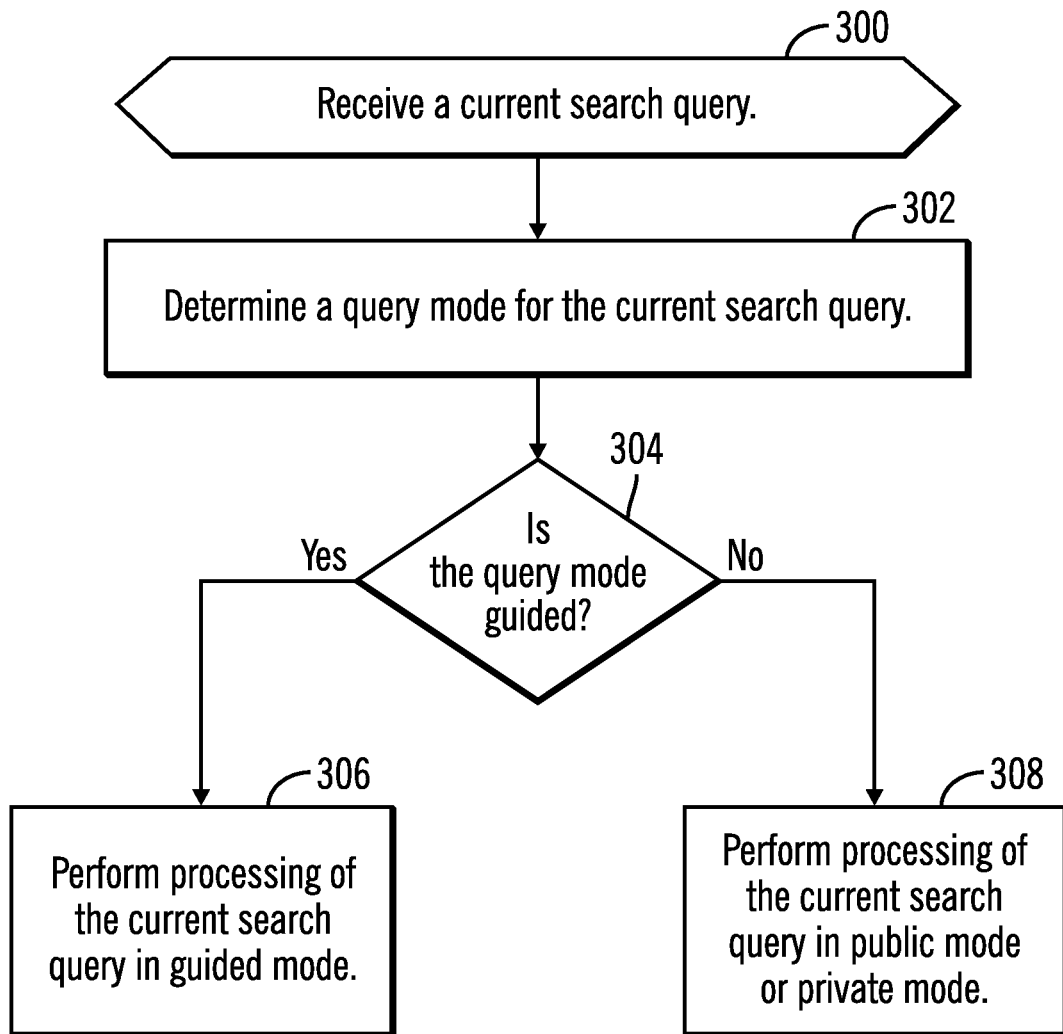
FIG. 3 illustrates, in a flowchart, operations for determining a mode in accordance with certain embodiments.

FIG. 3 illustrates, in a flowchart, operations for determining a mode in accordance with certain embodiments. Control begins at block 300 with the search service 130 receive a current search query. In block 302, the search service 130 determines a query mode for the current search query. The query mode may be a parameter of the current search query. If the query mode is not provided as a parameter of the current search query, the search service 130 uses a default query mode. The default query mode may be stored in the user profile of the user issuing the current search query.

In block 304, the search service 130 determines whether the query mode is a guided mode. If so, processing continues block 306, otherwise, processing continues to block 308. In block 306, the search service 130 performs processing of the current search query in guided mode. In block 308, the search service 130 performs processing of the current search query in public mode or private mode.

Figure 4A:
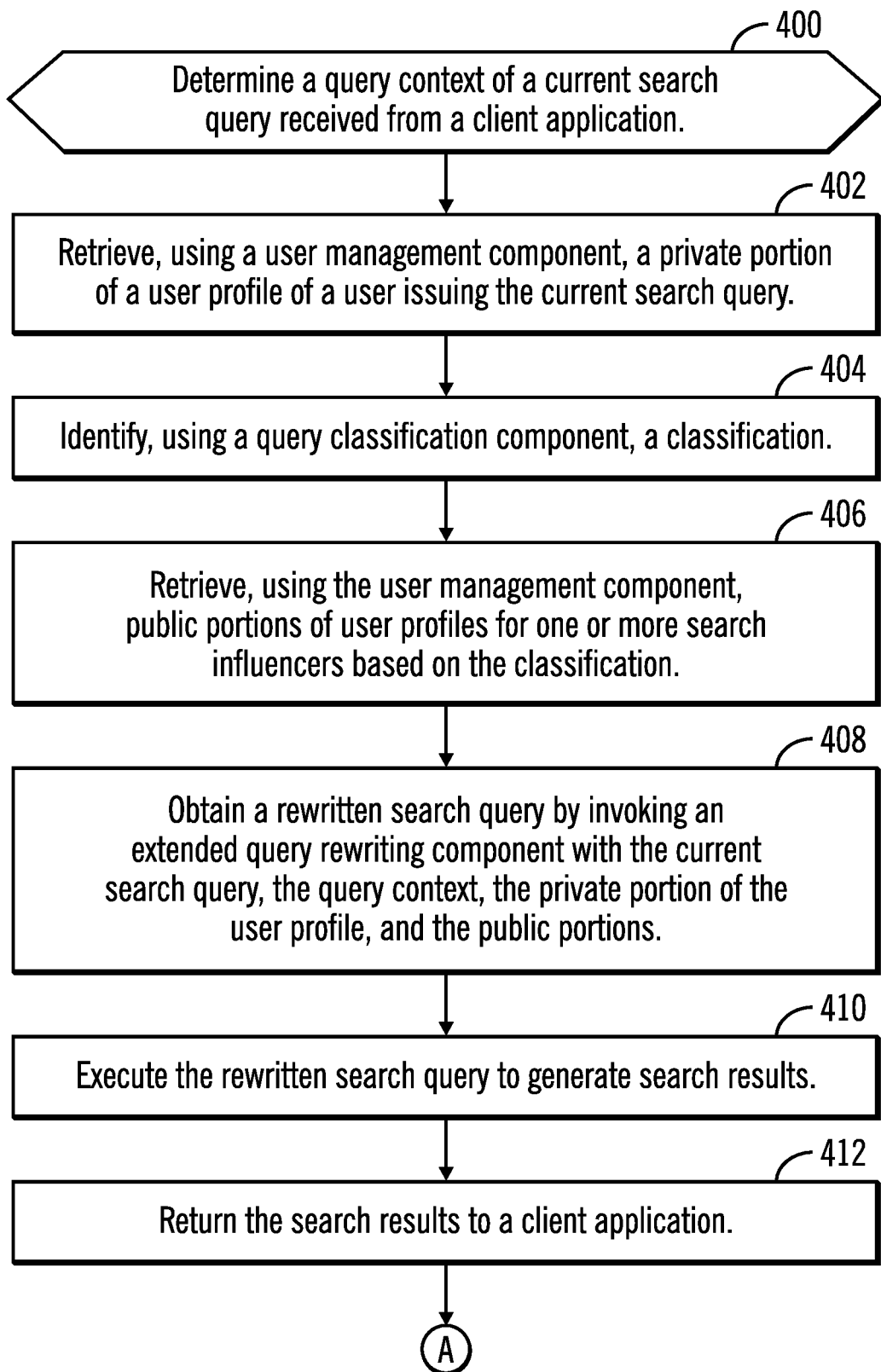
FIGS. 4A and 4B illustrate, in a flowchart, operations for performing processing in guided mode in accordance with certain embodiments.
Figure 4B:
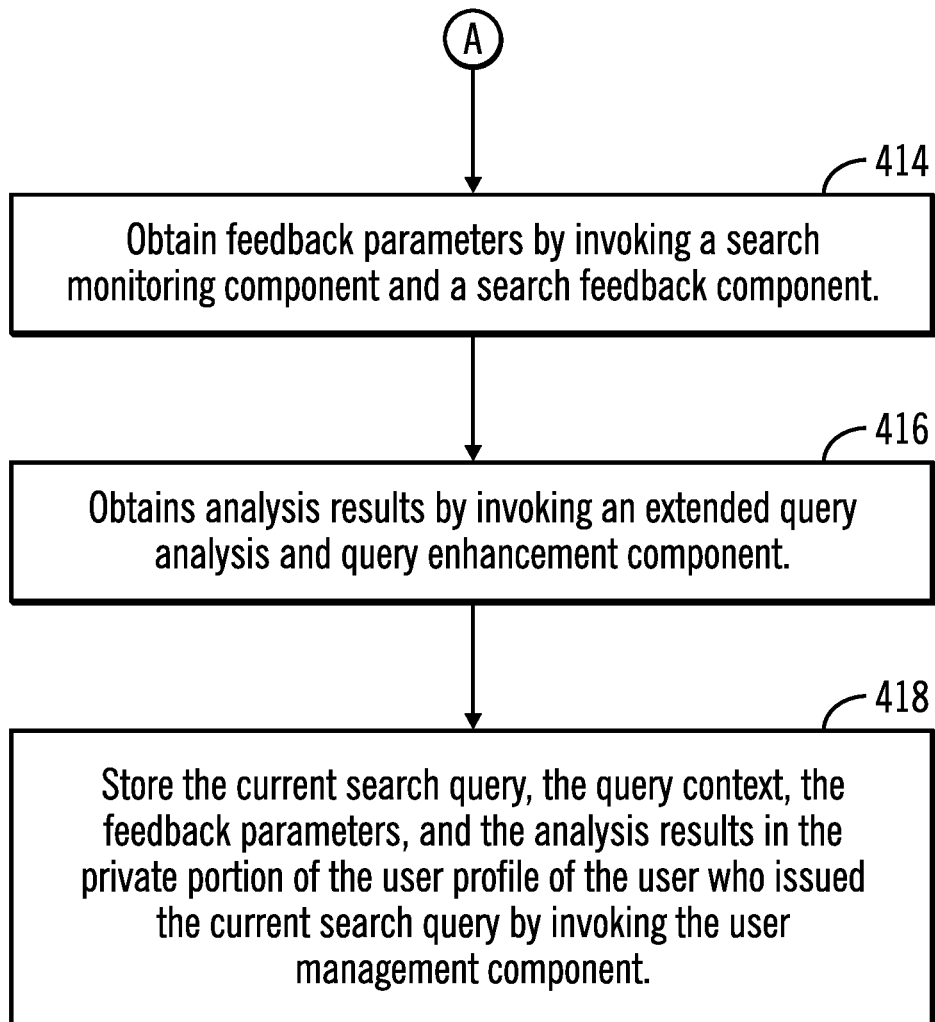

FIGS. 4A and 4B illustrate, in a flowchart, operations for performing processing in guided mode in accordance with certain embodiments. In guided mode, the search service 130 uses data from user profiles that reflects analysis of prior search queries of one or more other users for processing the current search query. In this manner, the search service 130 uses the "expertise" of the one or more other users to process the current search query.

Control begins at block 400 with the search service 130 determining a query context of a current search query received from a client application 102.

In block 402, the search service 130 retrieves, using the user management component 140, a private portion of a user profile of the user issuing the current search query. In certain embodiments, the search service 130 invokes the user management component 140, the user management component 140 retrieves the private portion, and the user management component 140 returns the private portion to the search service 130.

In block 404, the search service 130 identifies, using a query classification component, a classification. In certain embodiments, the search service 130 invokes the query classification component 150 to classify the search query based on the keywords in the current search query, the query classification component 150 identifies the classification, and the query classification component 150 returns the classification to the search service 130. In certain embodiments, the query classification component 150 implements function c:

classification=c (current search query, query context, private portion of user profile of the user who issued the current search query)

That is, the classification is determined based on the current search query, the query context, and the private portion of the user profile of the user issuing the current search query. In certain embodiments, the function c retrieves the set of search terms from the current search query and the stored search queries of the user profile and determines that search queries having the same or similar search terms have a same classification.

In block 406, the search service 130 retrieves, using the user management component 140, public portions of user profiles for one or more search influencers based on the classification. In certain embodiments, the search service 130 invokes the user management component 140, the user management component 140 uses the classification to identify one or more search influencers, the user management component 140 retrieves public portions of user profiles for the one or more search influencers, and the user management component 140 returns the public portions to the search service 130. In certain embodiments, the search service 130 invokes the user management component 140 to determine the one or more search influencers S on the basis of the classification and the user profile of the user issuing the current search query. In certain embodiments, the search service 130 implements function h:

set of social influencers S=h (classification, private portion of user profile of the user who issued the current search query)

That is, the search influencers are identified based on the classification and the private portion of the user profile of the user who issued the current search query. In certain embodiments, function h also considers the query context. Once the search influencers are identified, the user management component 140 retrieves the public portion of the user profile of the identified one or more search influences.

Optionally, the search service 130 merges the search and ranking configuration of the user who issued the current search query with the search and ranking configurations of the one or more search influencers in the user's user profile.

In block 408, the search service 130 obtains a rewritten search query by invoking an extended query rewriting component 152 with the current search query, the query context, the private portion of the user profile of the user who issued the current search query, and the public portions of the user profiles for the one or more search influencers. In certain embodiments, the search service 130 invokes the extended query rewriting component 152, the extended query rewriting component 152 rewrites the current search query, and the extended query rewriting component 152 returns a rewritten search query to the search service 130.

In certain embodiments, the search service invokes the extended query rewriting component 152 to rewrite the current search query into an improved search query Q1. The extended query rewriting component 152 implements the rewriting function f1. The rewriting function f1 takes as input parameters (these are passed to the extended query rewriting component 152 by the search service 130) the current search query, the current search query context, a reference to the private portion of the user profile of the user issuing the current search query, and a reference to the public portions of the user profiles of the search influencers. In certain embodiments, the public portion of a user profile stores the previous search queries of this user that were issued with the public query mode, the query context, the feedback parameters, as well as, the analysis results of previous analysis of these stored search queries. The following is a format of the function f1 for the improved search query Q1:

Q1=f1 (current search query, query context, private portion of the user profile of the user who issued the current search query, public portions of user profiles of search influencers)

The extended query rewriting component 152 analyzes the stored search queries, the query context, feedback parameters, and, optionally, analysis results and creates a rewritten search query based on the results of this analysis. The extended query rewriting component 152 returns the resulting rewritten search query. In certain embodiments, the extended query rewriting component 152 may also merge the current user's private user profile into the set of public user profiles before performing the rewriting.

In block 410, the search service 130 executes the rewritten search query to generate search results. The search service 130 uses one or both of the indexes 162, 164 to execute the rewritten search query. In certain embodiments, the search service 130 ranks the search results based on search and ranking parameters in the user profile.

In certain embodiments, the search service 130 adjusts the search results before returning them by implementing function g1:

final search results=g1 (original search result, private portion of the user profile of the user who issued the current search query, public portions of user profiles of search influencers)

In certain embodiments, function g1 also considers the query context. In block 412, the search service 130 returns (i.e., passes) the search results to a client application 102. From block 412 (FIG. 4A), processing continues to block 414 (FIG. 4B).

In block 414, the search service 130 obtains feedback parameters by invoking a search monitoring component 144 and a search feedback component 146. In certain embodiments, the search service 130 invokes a search monitoring component 144 and a search feedback component 146, the search monitoring component 144 manages the monitoring, while the search feedback component 146 generates feedback parameters to reflect how the user interacts with the search results (e.g., clicks on a result of the search results, starts a new search, etc.), the search feedback component 146 returns the feedback parameters to the search monitoring component 144, and the search monitoring component 144 returns the feedback parameters to the search service 130.

In block 416, the search service 130 obtains analysis results by invoking an extended query analysis and query enhancement component 142. In certain embodiments, the extended query analysis and query enhancement component 142 analyzes the current search query and previously issued search queries in the private portion of the user profile of the user who issued the current search query and in the public portions of user profiles of search influencers, then, the extended query analysis and query enhancement component 142 generates the analysis results. The extended query analysis and query enhancement component 142 returns the analysis results to the search service. For example, the analysis results may include preferences of a user (e.g., that a user fits into a group of users sharing certain characteristics of the query context and who prefer searches in a particular geographic location for restaurants).

In block 418, the search service 130 stores the current search query, the query context, the feedback parameters, and the analysis results in the private portion of the user profile of the user who issued the current search query by invoking the user management component 140. In certain embodiments, the search service 130 invokes the user management component 140 with the current search query, the query context, the feedback parameters, and the analysis results, and the user management component 140 stores the current search query, the query context, the feedback parameters, and the analysis results in the private portion of the user profile of the user who issued the current search query in the private portion of the user profile.

In certain embodiments, the search service 130 also updates the search and ranking configuration based on the feedback parameters and/or the analysis results.

In certain embodiments, f1 is a function to rewrite a search query implemented by the extended query rewriting component 152. In certain embodiments, h is a function to select one or more search influencers implemented by the user management component 140. In certain embodiments, c is a function to classify a search query implemented by the query classification component 150.

Thus, embodiments use the search queries of one or more search influencers to rewrite a current search query of a user. In certain embodiments, the search service 130 is extended to provide a user interface (or an API) that allows a first user of the search service 130 to select another, second user, as a search influencer.

When the first user later issues a search query, the search service 130 will process this search query and the search results with dependence on the search and ranking configuration and the search behavior of the selected search influencer (i.e., the selected second user). By selecting a search influencer, the first user may align a search and ranking configuration with the search and ranking configuration of a search expert or a domain expert. This enables the first user to benefit from expert knowledge.

Figure 5A:
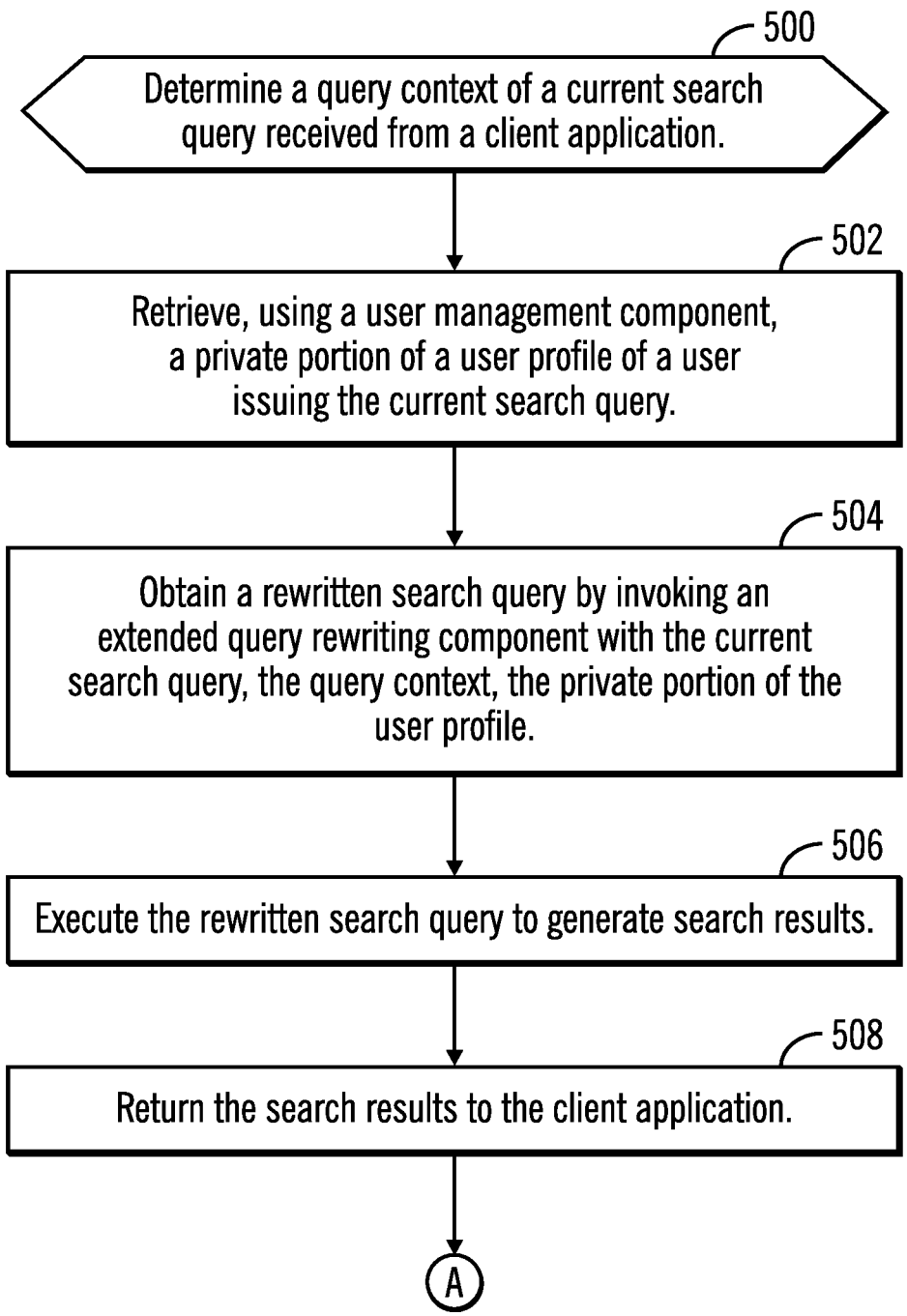
FIGS. 5A and 5B illustrate, in a flowchart, operations for performing processing in public or private mode in accordance with certain embodiments.
Figure 5B:
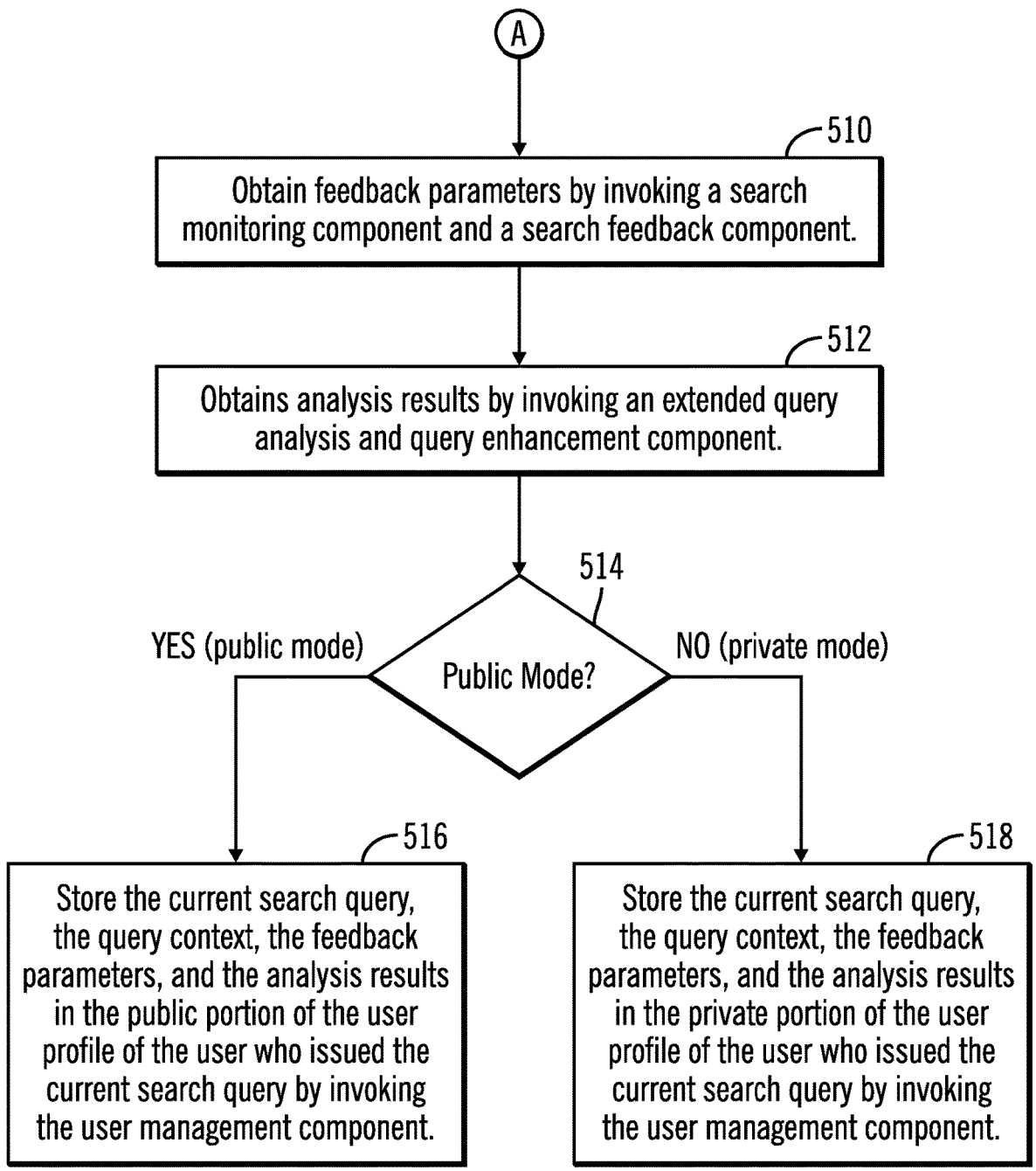

FIGS. 5A and 5B illustrate, in a flowchart, operations for performing processing in public or private mode in accordance with certain embodiments. Control begins at block 500 with the search service 130 determining a query context of a current search query received from a client application 102.

In block 502, the search service 130 retrieves, using the user management component 140, a private portion of a user profile of the user issuing the current search query. In certain embodiments, the search service 130 invokes the user management component 140, the user management component 140 retrieves the private portion, and the user management component 140 returns the private portion to the search service 130.

In block 504, the search service 130 obtains a rewritten search query by invoking the extended query rewriting component 152 with the current search query, the query context, and the private portion of the user profile of the user who issued the current search query. In certain embodiments, the search service invokes the extended query rewriting component 152 to rewrite the current search query into an improved search query Q2. The extended query rewriting component 152 implements a rewriting function f2. The rewriting function f2 takes as input parameters (these are passed to the extended query rewriting component 152 by the search service 130) the current search query, the query context, and a reference to the private portion of the user profile of the user issuing the current search query. In certain embodiments, the private portion of the user profile stores the previous search queries of this user, the query context, the feedback parameters, as well as, the analysis results of previous analysis of these stored search queries. The following is a format of the function f2 for the improved search query Q2:

Q2=f2 (current search query, query context, private portion of user profile of user who issued the current search query)

The extended query rewriting component 152 analyzes the stored search queries, the query context, the feedback parameters, and, optionally, the analysis results and creates a rewritten search query. The extended query rewriting component 152 returns the resulting rewritten search query.

In block 506, executes the rewritten search query Q2 to generate search results. The search service 130 uses one or both of the indexes 162, 164 to execute the rewritten search query. In certain embodiments, the search service 130 ranks the search results based on search and ranking parameters in the user profile. In certain embodiments, the search service 130 adjusts the search results before returning them by implementing function g2:

final search results=g2 (original search result, private portion of user profile of user who issued the current search query)

In certain embodiments, function g2 also considers the query context. In block 508, the search service 130 returns (i.e., passes) the search results to the client application 102. From block 508 (FIG. 5A), processing continues to block 510 (FIG. 5B).

In block 510, the search service 130 obtains feedback parameters by invoking a search monitoring component 144 and a search feedback component 146. In certain embodiments, the search service 130 invokes a search monitoring component 144 and a search feedback component 146, the search monitoring component 144 manages the monitoring, while the search feedback component 146 generates feedback parameters to reflect how the user interacts with the search results (e.g., clicks on a result of the search results, starts a new search, etc.), the search feedback component 146 returns the feedback parameters to the search monitoring component 144, and the search monitoring component 144 returns the feedback parameters to the search service 130.

In block 512, the search service 130 obtains analysis results by invoking an extended query analysis and query enhancement component 142. In certain embodiments, the extended query analysis and query enhancement component 142 analyzes the current search query and previously issued search queries in the private portion of the user profile of the user who issued the current search query, then, the extended query analysis and query enhancement component 142 generates the analysis results. The extended query analysis and query enhancement component 142 returns the analysis results to the search service. For example, the analysis results may include preferences of a user (e.g., that a user fits into a group of users sharing certain characteristics of the query context and who prefer searches in a particular geographic location for restaurants).

In block 514, the search service 130 determines whether the query mode is public mode. If so, processing continues to block 518, otherwise, processing continues to block 520.

In block 516, the search service 130 stores the current search query, the query context, the feedback parameters, and the analysis results in the public portion of the user profile of the user who issued the current search query by invoking the user management component 140. Because the data is stored in the public portion of the user profile, the search service 130 is able to use the data for enhancing subsequent search queries of other users. In certain embodiments, the search service 130 also updates the search and ranking configuration based on the feedback parameters and/or the analysis results.

In certain embodiments, the search service 130 invokes the user management component 140 with the current search query, the query context, the feedback parameters, and the analysis results, and the user management component 140 stores the current search query, the query context, the feedback parameters, and the analysis results in the private portion of the user profile of the user who issued the current search query in the private portion of the user profile.

In block 518, the search service 130 stores the current search query, the query context, the feedback parameters, and the analysis results in the private portion of the user profile of the user who issued the current search query by invoking the user management component 140. Because the data is stored in the private portion of the user profile, the search service 130 is able to use the data during for enhancing subsequent search queries of this user. In certain embodiments, the search service 130 also updates the search and ranking configuration based on the feedback parameters and/or the analysis results.

In certain embodiments, the search service 130 invokes the user management component 140 with the current search query, the query context, the feedback parameters, and the analysis results, and the user management component 140 stores the current search query, the query context, the feedback parameters, and the analysis results in the private portion of the user profile of the user who issued the current search query in the private portion of the user profile.

In certain embodiments, query Q1 and query Q2 may be more generally written as follows:

Q3=f (current search query, query context, user profile data)

The extended query rewriting component 152 analyses the stored search queries contained in the provided portion of the user profile, the query contexts, and the feedback parameters related to these search queries. For public mode or private mode, the user profile data refers to the private portion of the user profile of the user who issued the current search query. For guided mode, the user profile data refers to both the public portions of the user profiles of the search influencers and the private portion of the user profile of the user who issued the current search query.

In certain embodiments, the extended query rewriting component 152 performs analysis by detecting patterns in the feedback parameters indicating preferences of the user for search results with certain characteristics (e.g., a certain title, certain content, certain keywords, etc.). From these patterns, the extended query rewriting component 152 creates a set of boost queries that boost certain content items according to the characteristics. The extended query rewriting component 152 then adds the boost queries to the current search query, resulting in the rewritten search query.

In certain embodiments, the extended query rewriting component 152 uses the query context to cluster the stored search queries and related feedback parameters, and then determines a set of boost queries specifically for each cluster. If a new search query is to be rewritten, the extended query rewriting component 152 determines the best matching cluster (e.g., based on query context of the new search query and the cluster) and adds the boost queries assigned to this cluster to the new search query.

In such embodiments, the user management component 140 implements function h to retrieve the user identifiers of the selected search influencers from a user profile of a user issuing a current search query.

In certain alternative embodiments, the user management component 140 may implement function h to autonomously and automatically select one or more search influencers. In such alternative embodiments. the user management component 140 clusters users into user groups using various factors (e.g., a same domain of email addresses, address data, geolocation, same or nearby IP addresses, information from directories, etc.) and a clustering technique (e.g., k-means clustering). The user management component 140 gathers feedback about the search quality perceived by users by monitoring how users interact with the results of previous search queries.

In certain embodiments, the user management component 140 processes the search history of each user to gather a set of keywords for each previous search query, where the keywords are determined from the search terms and the search results. In certain embodiments, the user management component 140 calculates an expertise measure per keyword on the basis of the feedback.

In certain embodiments, the user management component 140 refines the initial clustering using a similarity measure that is based on the similarity of keywords from the users' search history. For each user group, the user management component 140 calculates a keyword-user expertise-matrix. The user management component 140 traverses the matrix and selects users with high expertise for a keyword as search influencers (e.g., expert users) for users with a low expertise for the keyword. In certain embodiments, the user management component 140 saves the set of keyword-expert user identifier tuples in the user profile.

In additional embodiments, the user management component 140 selects one search influencer (expert user), who may be the overall top rated across all keywords, and returns this search influencer as a result of function h and, optionally, stores this search influencer in the user profile for future use.

In certain embodiments, the search service 130 manages multiple users. The search service 130 provides a user interface for selecting one or more search influencers. When a search query is received, the search service 130 identifies the one or more search influencers and determines the search influencers' search and ranking configurations (e.g., boost queries, rules for modifying the search query or the search results, ranking parameters and ranking models used for ranking the search results, the models or rules used for determining the semantic intent that is later used for adapting search queries and search results etc.). The search service 130 optionally merges the search and ranking configurations of the one or more search influencers with the search and ranking configuration of the user issuing the search query.

In certain embodiments, instead of or in addition to receiving selection of the one or more search influencers, the search service 130 automatically identifies one or more search influencers and determines the search and ranking configuration parameters by analyzing the search history of these one or more search influencers. Also, the search service 130 uses the determined search and ranking configurations for rewriting a current search query, processing the rewritten search query, and ranking the search results.

With embodiments, the search service 130 processes a search query based on a specific mode to improve search results. The search service 130 receives the search query issued by a user and automatically determines or receives selection of the query mode for the search query from a predefined list of search query modes, which includes at least one of public, private, and guided mode. The search service 130 allows the user to select one of the three query modes per query. The search service processes the search query based on the query mode.

In the public mode, the search service 130 uses information gathered during processing of the current search query for enhancing the search queries of other users.

In the private mode, the search service 130 does not use information gathered during processing of the current search query for enhancing search of other users. In the guided mode, the search service 130 uses information gathered by analysis of search queries of other users for automatically enhancing the current search query.

Figure 6A:
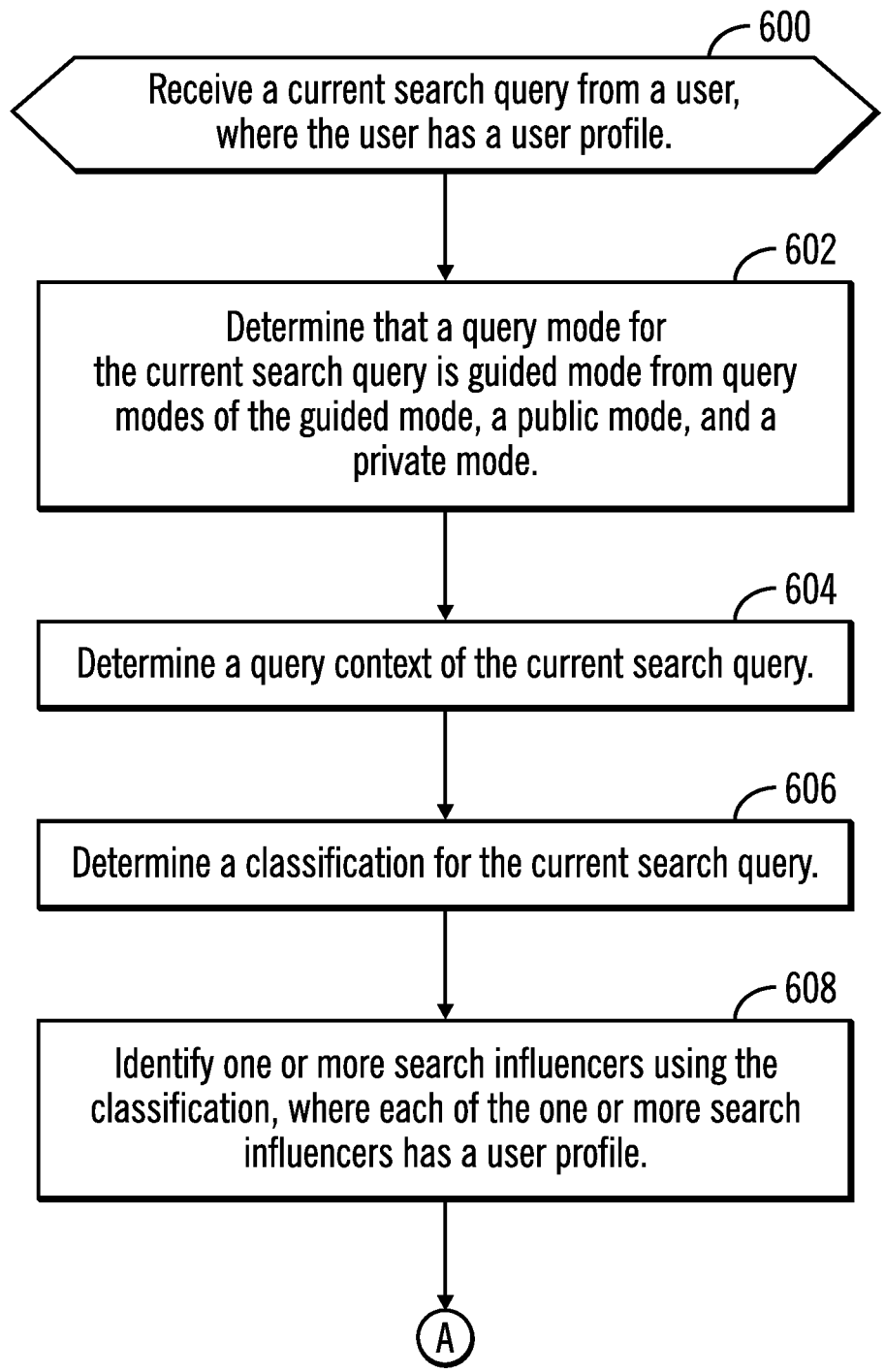
FIGS. 6A and 6B illustrate, in a flowchart, operations for generating search results in accordance with certain embodiments.
Figure 6B:
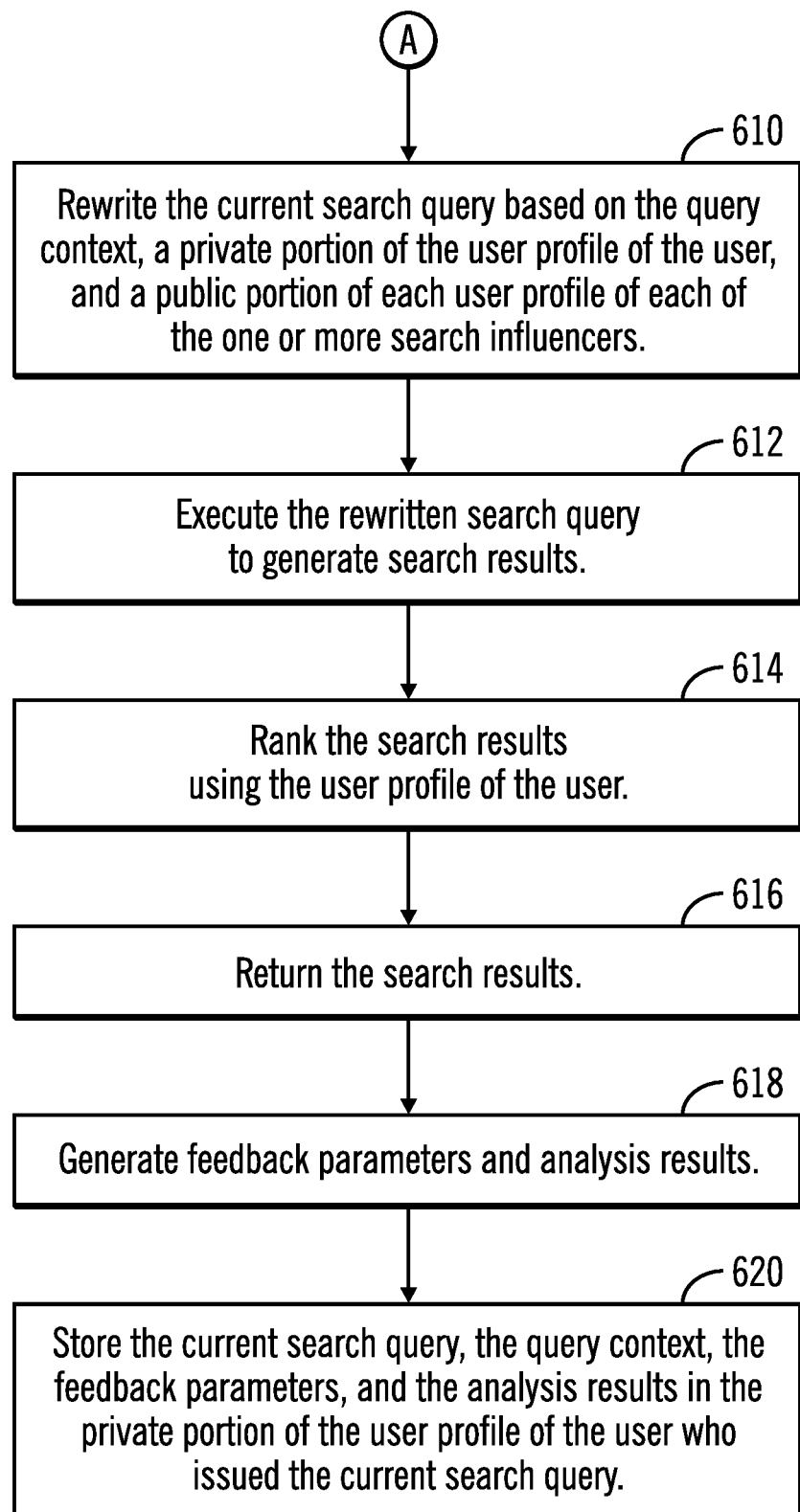

FIGS. 6A and 6B illustrate, in a flowchart, operations for generating search results in accordance with certain embodiments. Control begins at block 600 with the search service 130 receiving a current search query from a user, where the user has a user profile. In block 602, the search service 130 determines that a query mode for the current search query is guided mode from query modes of the guided mode, a public mode, and a private mode. This determining may find the guided mode in the current search query or in the user profile as a default query mode. In block 604, the search service 130 determines a query context of the current search query. In block 606, the search service 130 determines a classification for the current search query. In block 608, the search service 130 identifies one or more search influencers using the classification, where each of the one or more search influencers has a user profile. From block 608 (FIG. 6A), processing continues to block 610 (FIG. 6B).

In block 610, the search service 130 rewrites the current search query based on the query context, a private portion of the user profile of the user, and a public portion of each user profile of each of the one or more search influencers. In block 612, the search service 130 executes the rewritten search query to generate search results. In block 614, the search service 130 ranks the search results using the user profile of the user. In block 616, the search service returns the ranked search results. In block 618, the search service 130 receives feedback on the search results. In block 620, the search service 130 stores the feedback in the private portion of the user profile.

The search service 130 may automatically enhance a search query from the client application 102 by rewriting the search query. The extended query rewriting component 152 may rewrite the search query. The query rewriting may include adding subqueries (e.g., boost queries (in order to modify the ranking of some content items by boosting certain fields or characteristics while calculating the ranking score) or may include adding filter queries in order to filter out certain content items. In certain embodiments, the query rewriting uses heuristics and models. Some of these heuristics may be based on information that is gathered by analyzing prior search queries and certain feedback parameters that are derived by monitoring the user interacting with the search results with the search feedback component 146 and the search monitoring component 144. The query rewriting may also be based on analysis results generated by the extended query analysis and query enhancement component 142.

For example, the search service 130 may use the extended query analysis and query enhancement component 142 to analyze the stored search queries in the query store 166. By doing so, the search service 130 determines that a group of users sharing certain characteristics of the query context (e.g., user location="CityA") typically prefer products from CompanyX when interacting with search results of an online store.

The search service 130 may use heuristics to create a search context dependent boost query that boosts documents with the brand "CompanyX". When in future a search query arrives, the search service 130 may check whether the search context matches the search context conditions and, if there is a match, rewrites the search query to contain the boost query.

The search service 130 may store the analysis results and parameters for the query rewriting for a certain tenant and a certain collection of documents as a query enhancement configuration. For example, the search query may store the created boost queries ("brand:CompanyX") together with the conditions on the search context (user location="CityA") as part of the query enhancement configuration. This query enhancement configuration may be stored in any persistent storage (e.g., a database, a file system, a dedicated search index or the query store 166).

When a search query is received from the client application 102, the search service 130 may invoke the extended query analysis and query enhancement component 142 to rewrite the query. The extended query analysis and query enhancement component 142 retrieves the query enhancement configuration for the query from the query enhancement configuration store and selects the boost queries to use for rewriting the query on basis of the query context. The extended query analysis and query enhancement component 142 applies one or more boost queries and then forwards the rewritten search query to the search service 130.

Thus, the search service 130 may perform query enhancement on the basis of prior user behavior that is reflected in prior search queries issued by the user.

In a service infrastructure (such as that shown in FIG. 1), the search service 130 may be described as a software component that provides the API gateway 112. The API gateway 112 may be accessed or invoked by other services or software components using a protocol or an invocation mechanism. Any service may be implemented, created, removed, deployed, started, and stopped independently of other services. In certain embodiments, a service is a microservice, which is designed to be lightweight and granular.

In the service infrastructure, there may be multiple instances of the search service 130 running in order to improve fault tolerance, throughput, and load balancing of the search queries. Each of the multiple instances provides the API gateway 112 and offers the same functionality. Also, each of the multiple instances is based on the same implementation (e.g., code, docker image or deployment artifact).

Other services may interact with the search service 130 by sending search queries for invoking operations, via the API gateway 112, provided by the search service 130. The search queries may include an identifier of the requested operation (e.g., in the form of a Uniform Resource Locator (URL) or another parameter), as well as, further data that is relevant for processing the search query.

Usually, there is at least one service registry in the service infrastructure, which provides functionality for service discovery or service lookup. The service registry manages information about the active/running services in the service infrastructure. Before a first service may invoke a second service, such as the search service 130, the first service sends a lookup request to the service registry, containing a set of criteria for selecting the second service, such as a service name or service identifier. The service registry then selects one service instance of the search service 130, which adheres to the specified criteria, and returns information about the search service instance to the first service. This information may include an address (e.g., a HyperText Transfer Protocol (HTTP) URL or a hostname or Internet Protocol (IP) address and port), which is then used by the first service to create and send the invocation request to the second service. In case there is no service for the specified criteria, the service registry may return an error or indication that the service is not available.

The service registry maintains information about the status or health of each service instance, and considers healthy services for service discovery or service lookup requests. In case a service instance becomes unresponsive or unhealthy, the service registry will no longer provide that service instance to other services. The service registry may also incorporate load balancing for distributing load between service instances, such as random choice, round robin, least connections, etc.

The search service 130 registers at the service registry, after starting (e.g., by sending a registration request including an address, as well as, further data, such as a service identifier or an identifier of the API gateway 112 provided by the search service 130). The service registry then regularly invokes a health check (status request) on the registered search service 130. The invoked search service 130 responds by returning status information (e.g., a binary flag indicating whether the search service 130 is healthy or unhealthy). If the returned status indicates a problem or if the search service 130 does not respond in time, the service registry will flag the search service 130 as unhealthy.

Thus, in certain embodiments, the service registry selects a service instance based on two criteria: the binary flag representing the health status and a service identifier (e.g., a service name).

The service infrastructure may be built in a cloud computing environment. The cloud computing environment may be separated by a firewall from a network (e.g., the Internet). The API gateway 112 provides the client application 102 with access to the search service 130. The API gateway 112 receives a search query issued by the client application 102 and creates a service lookup request on the basis of the search query. The API gateway 112 sends the service lookup request to the service registry, receives the address of a service instance of the search service 130 to invoke, and sends an invocation request to this service instance. The API gateway 112 receives the response from the service instance, creates a response to the client request from the received response, and returns the created response to the client application 102.

While processing the request received from the API gateway 112, the service instance of the search service 130 may invoke another service. The service instance of the search service 130 prepares a lookup request, sends this lookup request to the service registry, receives the address of a service instance of the other service, and invokes the service instance using the received address.

The service infrastructure and the search service 130 may serve multiple users and multiple tenants. A tenant may be described as a group of users (e.g., a company) who share a common access with specific privileges to the service instance. The service infrastructure and the search service 130 ensure that tenant specific data is isolated from other tenants. Typically, a search query contains a tenant identifier (ID) of the tenant that is associated with the search query, which allows the service infrastructure to establish the context and state for processing the search query for a particular tenant.

In certain embodiments, the search service 130 provides an API for indexing content items, which makes the content item searchable by the search service 130. The search service 130 also provides a search query API that allows a client (e.g., another service or an application) to issue the search query. The search query contains a set of query parameters that specify criteria for searching content items, such as a set of search terms. The search service 130 processes the query by selecting and ranking a set of content items according to the search query.

The ranking determines a scoring or an order of the content items relative to the search query, and the ranking represents how relevant a content item is in relation to the search query. Various ranking techniques may be used. The search query may also contain parameters for controlling the ranking (e.g., a ranking query, a boost query or a boost function) or the search service 130 may automatically select the heuristics and parameters for the ranking. In certain embodiments, ranking may be based on statistics about the search corpus and the search terms, as well as, statistics about the occurrence of search terms in specific content items, etc.

An example ranking method is term frequency-inverse document frequency (tf-idf), which is a numerical statistic that is intended to reflect how important a word is to a document in a collection of documents (i.e., a corpus of documents). The tf-idf technique may be used as a weighting factor in ranking a document's relevancy in the search service 130 relative to a given search query. The tf-idf value increases proportionally to the number of times a word appears in the document and is offset by the frequency of the word in the corpus.

The search service 130 may manage multiple indexes. The search service 130 may be used in a multi-tenant environment (e.g., by creating a separate index for each tenant). Then, the search service 130 may select one or more indexes to use for search queries depending on the tenant context.

Thus, with embodiments, the mode-specific search query processing uses a search service 130 that receives a current search query issued by an entity (e.g., a user, a computer, a robot, etc.). The search service 130 determines the query mode for the current search query from a predefined list of modes for processing the current search query. In certain embodiments, the predefined list of modes includes: public mode, private mode, and guided mode.

The search service 130 processes the current search query based on the determined mode. In public mode, the search service 130 uses information gathered during processing of the current search query for enhancing search queries of other users. In private mode, the search service 130 does not use information gathered during processing of the current search query for enhancing search queries of other users. In guided mode, the search service 130 uses information gathered by analysis of search queries of other users for automatically enhancing the current search query.

With embodiments, the search service 130 may receive selection of a mode by the entity or may automatically determine the mode based on various factors.

With embodiments, of guided mode is selected, then the search service 130 identifies one or more other user's whose search queries are used to enhance the current search query.

Figure 7:
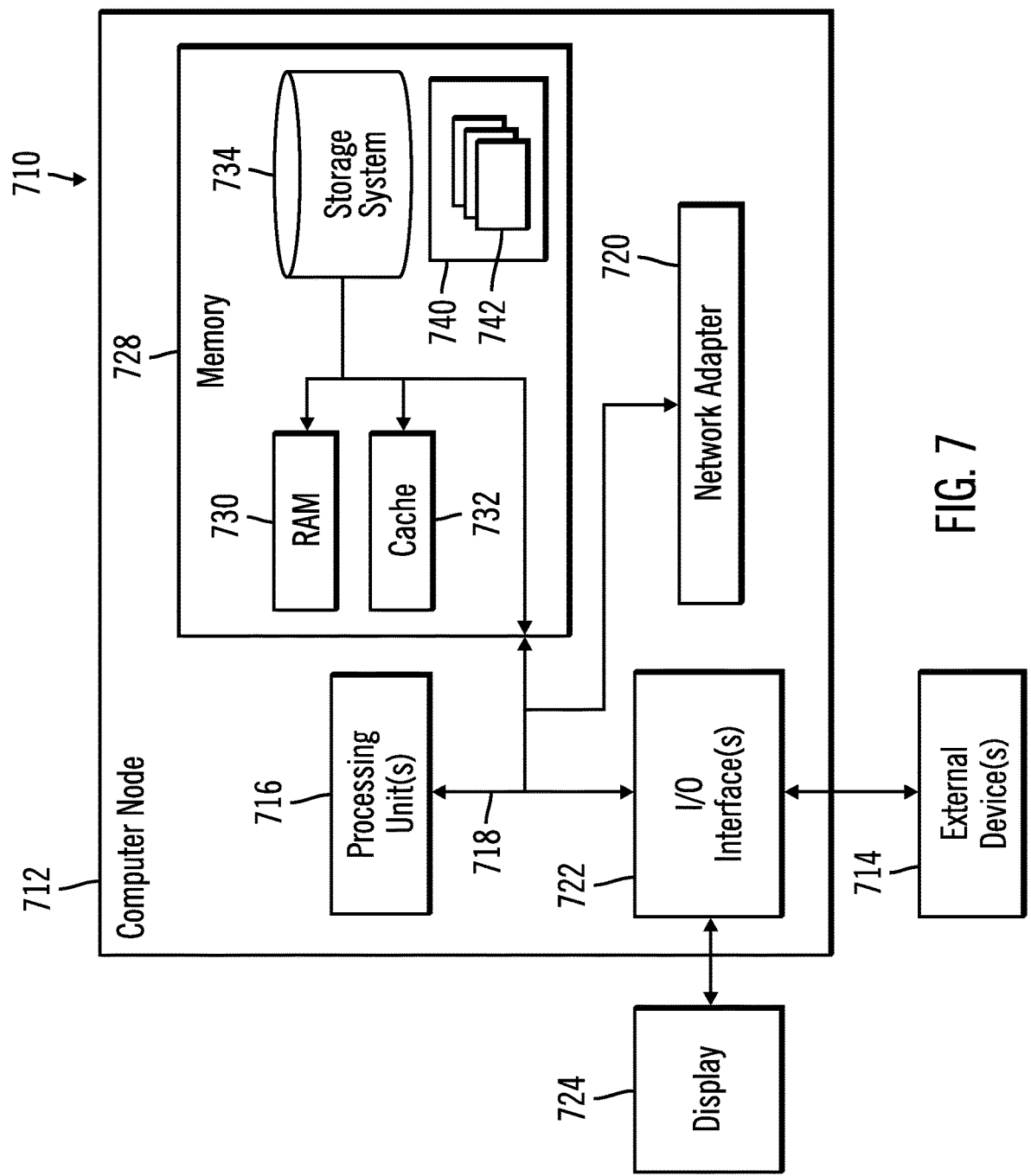
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the client computers 100, 104 and/or the server computer 110 has the architecture of computer node 700. In certain embodiments, the client computers 100, 104 and/or the server computer 110 are part of a cloud infrastructure. In certain alternative embodiments, the client computers 100, 104 and/or the server computer 110 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
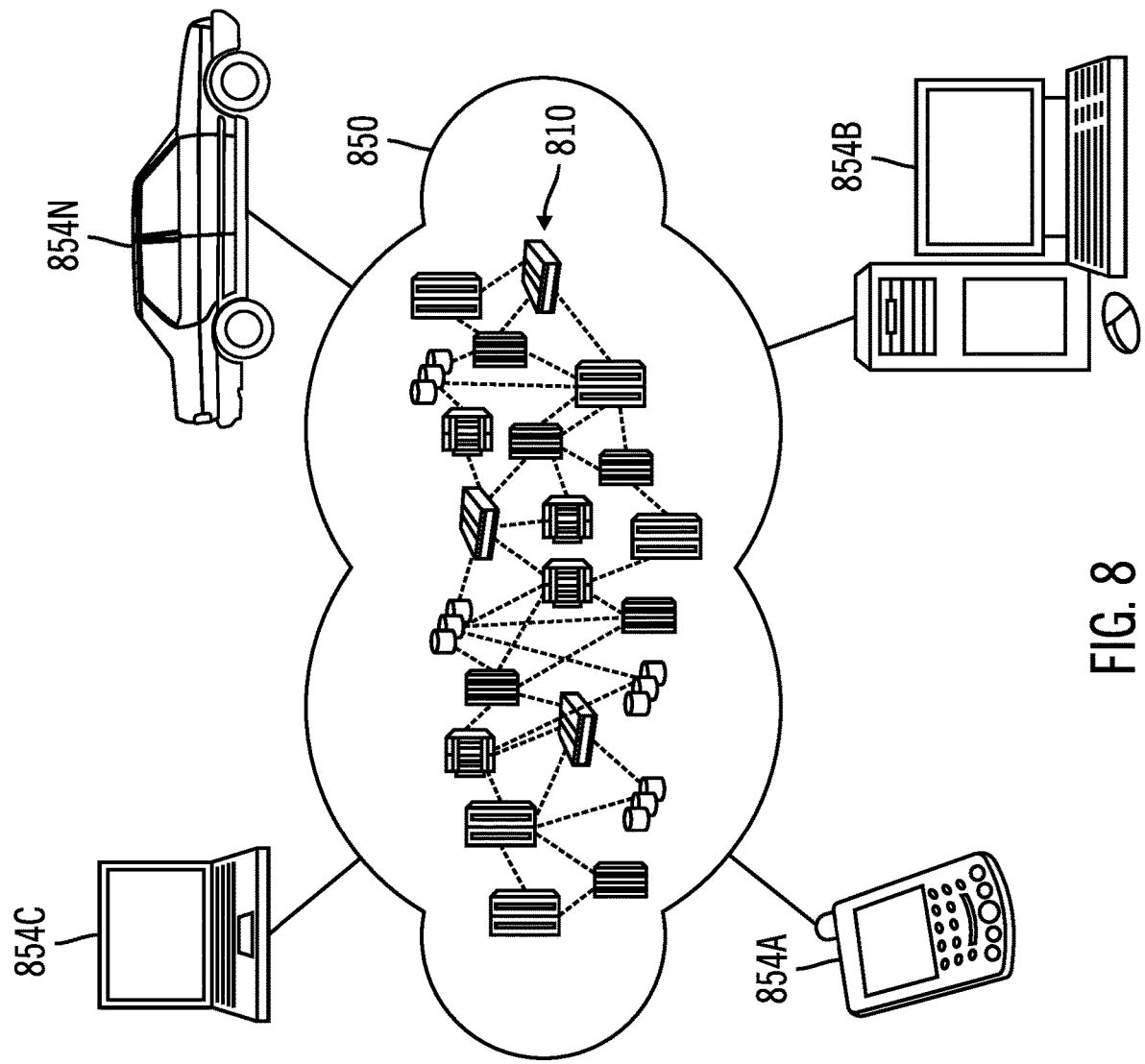
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators.

Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and mode-specific search query processing 996.

Thus, in certain embodiments, software or a program, implementing mode-specific search query processing in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
receiving a plurality of search queries from a user, wherein the user has a user profile, and wherein the user profile has a public portion and a private portion;
determining a query mode and a query context for each of the plurality of search queries, wherein the query mode comprises one of a guided mode, a public mode, and a private mode;
in response to determining that the query mode for a first search query of the plurality of search queries is the guided mode,
rewriting the first search query based on the query context, the private portion of the user profile of the user, and the public portion of each corresponding user profile of each of one or more search influencers to generate a first rewritten search query;
executing the first rewritten search query to generate first search results;
returning the first search results; and storing the first search query in the private portion of the user profile of the user;

in response to determining that the query mode for a second search query of the plurality of search queries is the public mode, rewriting the second search query based on the query context and the private portion of the user profile of the user to generate a second rewritten search query;

executing the second rewritten search query to generate second search results;

returning the second search results;

storing the second search query in the public portion of the user profile of the user; and in response to determining that the query mode for a third search query of the plurality of search queries is the private mode, rewriting the third search query based on the query context and the private portion of the user profile of the user to generate a third rewritten search query;

executing the third rewritten search query to generate third search results;

returning the third search results; and storing the third search query in the private portion of the user profile of the user.

2. The computer-implemented method of claim 1, further comprising operations for: obtaining feedback parameters generated from monitoring user interaction with one of the first search results, the second search results, and the third search results.

3. The computer-implemented method of claim 1, further comprising operations for:

in response to determining that the query mode is the guided mode, obtaining analysis results generated from analyzing queries in the private portion of the user profile of the user and the public portion of each corresponding user profile of each of the one or more search influencers.

4. The computer-implemented method of claim 1, further comprising operations for:

in response to determining that the query mode is one of the public mode and the private mode, obtaining analysis results generated from analyzing queries in the private portion of the user profile of the user.

5. The computer-implemented method of claim 1, further comprising operations for: adjusting one of the first search results, the second search results, and the third search results based on the private portion of the user profile of the user.

6. The computer-implemented method of claim 1, wherein a Software as a Service (SaaS) is configured to perform the operations of the method.

7. The computer-implemented method of claim 1, wherein a prior query is stored in one of the public portion and the private portion of the user profile of the user based on the query mode for executing the prior query.

8. A computer program product, the computer program product comprising a computer readable storage medium having program code embodied therewith, the program code executable by at least one processor to perform operations for:

receiving a current search query from a user, wherein the user has a user profile, and wherein the user profile has a public portion and a private portion;

determining a query mode and a query context for the current search query, wherein the query mode comprises one of a guided mode, a public mode, and a private mode;

in response to determining that the query mode is the guided mode, rewriting the current search query based on the query context, the private portion of the user profile of the user, and the public portion of each corresponding user profile of each of one or more search influencers to generate a first rewritten search query;

executing the first rewritten search query to generate first search results;

returning the first search results; and storing the current search query in the private portion of the user profile of the user; and in response to determining that the query mode is one of the public mode and the private mode, rewriting the current search query based on the query context and the private portion of the user profile of the user to generate a second rewritten search query;

executing the second rewritten search query to generate second search results;

returning the second search results;

in response to the query mode being the public mode, storing the current search query in the public portion of the user profile of the user; and in response to the query mode being the private mode, storing the current search query in the private portion of the user profile of the user.

9. The computer program product of claim 8, wherein the program code is executable by the at least one processor to perform operations for:

obtaining feedback parameters generated from monitoring user interaction with one of the first search results and the second search results.

10. The computer program product of claim 8, wherein the program code is executable by the at least one processor to perform operations for:

in response to determining that the query mode is the guided mode, obtaining analysis results generated from analyzing queries in the private portion of the user profile of the user and the public portion of each corresponding user profile of each of the one or more search influencers.

11. The computer program product of claim 8, wherein the program code is executable by the at least one processor to perform operations for:

in response to determining that the query mode is one of the public mode and the private mode, obtaining analysis results generated from analyzing queries in the private portion of the user profile of the user.

12. The computer program product of claim 8, wherein the program code is executable by at the least one processor to perform operations for:

adjusting one of the first search results and the second search results based on the private portion of the user profile of the user.

13. The computer program product of claim 8, wherein a Software as a Service (SaaS) is configured to perform the operations of the computer program product.

14. The computer program product of claim 8, wherein a prior query is stored in one of the public portion and the private portion of the user profile of the user based on the query mode for executing the prior query.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

receiving a current search query from a user, wherein the user has a user profile, and wherein the user profile has a public portion and a private portion;

determining a query mode and a query context for the current search query, wherein the query mode comprises one of a guided mode, a public mode, and a private mode;

in response to determining that the query mode is the guided mode, rewriting the current search query based on the query context, the private portion of the user profile of the user, and the public portion of each corresponding user profile of each of one or more search influencers to generate a first rewritten search query;

executing the first rewritten search query to generate first search results;

returning the first search results; and storing the current search query in the private portion of the user profile of the user; and in response to determining that the query mode is one of the public mode and the private mode, rewriting the current search query based on the query context and the private portion of the user profile of the user to generate a second rewritten search query;

executing the second rewritten search query to generate second search results;

returning the second search results;

in response to the query mode being the public mode, storing the current search query in the public portion of the user profile of the user; and in response to the query mode being the private mode, storing the current search query in the private portion of the user profile of the user.

16. The computer system of claim 15, wherein the operations further comprise:

obtaining feedback parameters generated from monitoring user interaction with one of the first search results and the second search results.

17. The computer system of claim 15, wherein the operations further comprise:

in response to determining that the query mode is the guided mode, obtaining analysis results generated from analyzing queries in the private portion of the user profile of the user and the public portion of each corresponding user profile of each of the one or more search influencers.

18. The computer system of claim 15, wherein the operations further comprise:

in response to determining that the query mode is one of the public mode and the private mode, obtaining analysis results generated from analyzing queries in the private portion of the user profile of the user.

19. The computer system of claim 15, wherein a Software as a Service (SaaS) is configured to perform the operations of the computer system.

20. The computer system of claim 15, wherein a prior query is stored in one of the public portion and the private portion of the user profile of the user based on the query mode for executing the prior query.

* * * * *